United States Patent [19]

Weisner

[11] 4,181,115
[45] Jan. 1, 1980

[54] POWER CONTROL OF A STONE CUTTING MACHINE HAVING CUTTING CHAINS

[75] Inventor: Horst Weisner, Herdecke-Ende, Fed. Rep. of Germany

[73] Assignee: Machinenfabrik Korfmann GmbH, Witten, Fed. Rep. of Germany

[21] Appl. No.: 883,215

[22] Filed: Mar. 3, 1978

[30] Foreign Application Priority Data

Mar. 5, 1977 [DE] Fed. Rep. of Germany ....... 2709687

[51] Int. Cl.$^2$ ............................................. B28D 1/08
[52] U.S. Cl. ................................... 125/21; 51/165.91
[58] Field of Search ...................... 51/165.77, 165.91; 125/12, 21

[56] References Cited

U.S. PATENT DOCUMENTS

| 4,038,962 | 8/1977 | Tessner | 125/21 |
| 4,075,792 | 2/1978 | Schreiber | 51/165.92 |

FOREIGN PATENT DOCUMENTS

2536984  3/1977  Fed. Rep. of Germany ............. 125/21

*Primary Examiner*—Harold D. Whitehead
*Attorney, Agent, or Firm*—Thomas E. Beall, Jr.

[57] ABSTRACT

In a stone cutting machine having a cutting chain rotated by a motor and a separate power feed for the machine, the power consumption of the drive motor is monitored. When the power consumption falls below a minimum, a control signal is generated to increase the feed, and when the power consumption exceeds a fixed maximum, a control signal is generated to decrease the feed. In generating the control signal, the power consumption is scanned only over a pre-determined period, which for power consumption beneath the minimum is approximately twice as long as for the power consumption above the maximum.

4 Claims, 4 Drawing Figures

POWER CONTROL OF A STONE CUTTING MACHINE HAVING CUTTING CHAINS

BACKGROUND OF THE INVENTION

The present invention relates to a process and a circuit for controlling the cutting power of a machine designed to cut stone material by means of a rotating stone cutting chain driven by an electromotor and guided on a cutting arm; the machine being moved forwards on a guide frame at a feed rate.

Stone cutting machines of this type comprise cutting chains which rotate at high speed, approximately 16 m/sec. peripheral speed. On account of the contact between the cutting elements consisting of diamond studded grinding elements and the stone material, the electromotor driving the chain must supply very powerful propelling forces of approx. 500 kp.

If there are extra hard spots in the stone material or if irregularities and vibrations are produced in the chain guide system or in the cutting line to be maintained parallel to the guide frame, vibrations will be produced in the rotating cutting chain in spite of the chain guide mounted between the drive wheel at the upper end of the cutting arm and the deflecting wheel at the lower end of the cutting arm. In addition, the cutting arm oscillates about the selected cutting line and the chain members or even the cutting arm move laterally against the two faces of the slit cut in the stone. This causes marked deceleration of the chain and twisting of the chain members.

To deal with these problems it was necessary to switch off the chain drive system and then pivot the cutting arm away from the cutting channel and then subsequently lower it again. Attempts were also made to largely obviate these irregularities and the resulting vibrations by means of separate guides for the machine frame, for the guide frame, and for the chain rotating on a chain guide provided on the cutting arm.

The proposed solutions were not advantageous, for example, because special measures were needed to prevent the cutting arm from being deflected from the selected cutting line. One such measure consisted in moving the guide rollers of the machine frame in an axial direction over the guide frame, thereby causing the entire machine, including the cutting arm, to be displaced in a horizontal direction relative to the direction of travel.

SUMMARY OF THE INVENTION

The object of the present invention is to improve the machine described initially in such a way as to prevent in advance any operating problems such as lateral shifting of the cutting arm and deflection from the original cutting direction, or jamming of the cutting chain, which can lead to premature wear of the cutting elements or even breaking of the cutting chain per se.

The invention is based on the theory that problems which occur—whether they are caused by operational inadequacies of the machine per se or by irregularities in the formation of the stone material—always result in an increase in the power consumption of the electromotor for the drive system of the stone cutting chain. Furthermore, these disturbances can almost always be reduced to the point where they do not adversely influence the operation of the stone cutting machine if the power consumption of the electromotor supplying the drive system of the chain, and hence the cutting power, is reduced per se.

The solution to the above problem provided by the invention consists in a process for controlling the cutting power of the stone cutting machine of the type described initially, wherein: a control value X is determined from the measured power fluctuation of the electromotor measured in a scanning period T, and an adjustment signal Y for the feed rate is obtained from the control value X and the actual value of the feed rate.

The advantage of this process is that the pressure of the cutting elements of the chain automatically adapt to the fluctuating propelling forces and thus to the operating problems which occur. If, for example, the cutting arm cuts into stone material of reduced strength the power consumption of the electromotor will be reduced and the pressure of the cutting elements will be increased as a result of the automatically increasing feed rate. As a result, the stone cutting chain will again be operated at optimum rates, i.e., at a propelling force of 500 kp and a peripheral speed of the chain of, for example, 16 m/sec. All operating problems affecting the stone cutting chain are eliminated by controlling the cutting power and power consumption of the electromotor in this manner. It is thus possible to produce a cut parallel to the guide frame without having to specially adjust the machine frame with respect to the guide frame or having to pivot the cutting arm out of the cutting channel. As periods of inoperation of the machine are thus virtually totally eliminated, a considerably increased cutting output is obtained.

It has been found that it is advantageous to allow the power consumption of the electromotor to vary automatically to a certain degree without external regulation as certain disturbances are limited timewise or in their extent. Accordingly, an advantageous feature of the process according to the invention is that the power fluctuation of the electromotor only results in the formation of a control value X, when the power fluctuation is below a given fixed minimum value and/or above a fixed maximum value.

As the operating data of the chain drive system as such represent values which correspond to loading of the electromotor and the guide parts of the machine, when the selected maximum value (for example, of 360 A motor current or a power consumption of 180 KW) of the power consumption of the electromotor is exceeded, the feed rate is slowly changed and thus the power consumption of the electromotor is corrected more gently than when a given minimum value of the power consumption is not reached.

According to the invention the scanning period T in the case of a power fluctuation below the given fixed minimum value is approximately twice the length of the scanning period T when the fixed maximum value of the power consumption of the electromotor is exceeded.

To form the value X and the nominal value, a process is proposed according to the invention wherein the value X is tapped from a resistance in a circuit controlled as a function of the power fluctuation and the voltage at the resistance is used to control a motor-driven nominal value indicator.

The scanning period T and the interval between the individual periods can be readily adjusted by means of a pulse interval relay. The scanning periods T can be arbitrarily adjusted in each case according to the necessary increase or reduction in the feed rate. Preferably, the scanning period T in the case of a power fluctuation beneath the fixed minimum value is approximately twice as long as the scanning period T in the case of a power fluctuation exceeding the fixed maximum value for the electromotor. For example, if the feed rate and thus the power consumption of the electromotor must be reduced, the length of the scanning period will be 30 seconds, whereas, when the feed rate is to be increased, the length of the scanning period will be 60 seconds. The interval between the individual scanning periods is intended to keep the nominal value constant until the next scanning period and thus any possible remaining difference between the nominal and actual value is initially maintained.

The invention also relates to a simple circuit for controlling the cutting power via the power fluctuation of the electromotor by varying the feed rate of the machine, wherein the power fluctuation of the electromotor is measured by an inductively coupled ammeter on which threshold value contacts indicate when the desired fixed minimum value of the power consumption of the electromotor is not attained or when the desired fixed maximum value thereof is exceeded. The advantage of this process for measuring the power fluctuation is that the fluctuation and formation of the value X can take place in separate fully electric circuits. Only a mechanical contact is required between the indicator of the ammeter and the threshold value contacts to transmit the particular power fluctuation as control values.

According to a feature of the circuit, only when the minimum value is not attained or when the maximum value is exceeded at the threshold value contacts is closing of a minimum contact switch or a maximum contact switch accomplished in the circuit for producing the value X, which is separate from the ammeter circuit. The circuit for producing the value X preferably consists of two parallel current paths each comprising one of the minimum and maximum contact switches, a pulse interval relay, an induction coil of an electromotor adjusting a nominal value indicator, and a limit switch.

A simple circuit is thereby obtained wherein the value X corresponding to the fluctuation of the power consumption of the electromotor producing a forward or return movement of an electromotor adjusting the nominal value indicator, and thus the issuing of a nominal value, is primarily determined by the switching on and off of two contact switches. The electromotor for adjusting the nominal value indicator is driven as long as one of the maximum or minimum contact switches and the corresponding pulse interval relay and limit switch are all closed. Only when one of the minimum or maximum contact switches, impulse interval relay, or limit switches opens is the nominal value indicated for a specific scanning period.

According to another feature of the circuit, the nominal value indicator and also the actual value indicator for the feed rate are both potentiometers, the nominal and actual values being obtained at the tapping points of the latter. The two potentiometers are connected to form a bridge circuit, and the unbalanced differential voltage can be amplified and used for adjusting the feed and thereby adjust the potentiometer of the actual value of the feed rate to balance the bridge circuit. As the tapping point of this potentiometer is also coupled to the speed regulating valve of the feed motor, the amplified differential signal simultaneously functions as the feed rate adjustment signal Y.

Forward and return movement of the feed valve adjusting motor as required thus adjusts the potentiometer tapping point, and can be obtained by controlling this adjusting motor as a function of the polarity of the unbalanced differential signal.

BRIEF DESCRIPTION OF THE DRAWING

The present invention will now be described in more detail by way of a circuit for controlling the feed rate, and thus the cutting power of the stone cutting machine, with reference to the accompanying drawings, in which:

FIG. 1 is a side view of the stone cutting machine 1 which moves forward on a guide frame 2 in the cutting direction 3. The cutting arm 4 with its cutting chain 5 rotating over an upper drive wheel, a lower deflecting roller 7 and a guide bar with contact faces 6 is pivoted by the piston cylinder 8 into its work position in the cutting channel. The width of the cutting channel corresponds to that of the cutting tool, which is slightly greater than that of the chain members. For example, if the cutting tool is 3 cm. in width, the width of the chain members is 2.6 cm. and the width of the arm is 2.2 cm. The cutting tool generally consists of flat, square cutting elements equipped with diamond chips. These cutting elements are on the guide and intermediate members of the stone cutting chain 5.

The guiding of the stone cutting machine on the upper drive wheel is critical as tensioning cylinders for the chain are mounted there and thus at this point the chain no longer passes over the guide bar. At elevated speeds of the cutting chain vibrations are produced at these points. These vibrations are distributed over the entire chain and lead to irregular pressure of the cutting elements and thus to unilateral wear of the diamond-studded cutting elements. In addition, the considerable length of the cutting arm can cause this to be deflected from the selected cutting line in the cutting channel which may, for example, be only 3 cm. wide and may cause it to strike alternately against the lateral faces. With the control system of the stone cutting machine 1 according to the invention where a power consumption variation of the electromotor for the chain drive system below or above a specific power consumption leads to an increase or reduction in the feed rate and thus in the pressure of the cutting elements, respectively, any disturbing factors negatively influencing the cutting accuracy and cutting rate are rendered negligible. In addition, automatic regulation of the rate of rotation of the chain with varying hardness of the stone is obtained.

Figure 1:
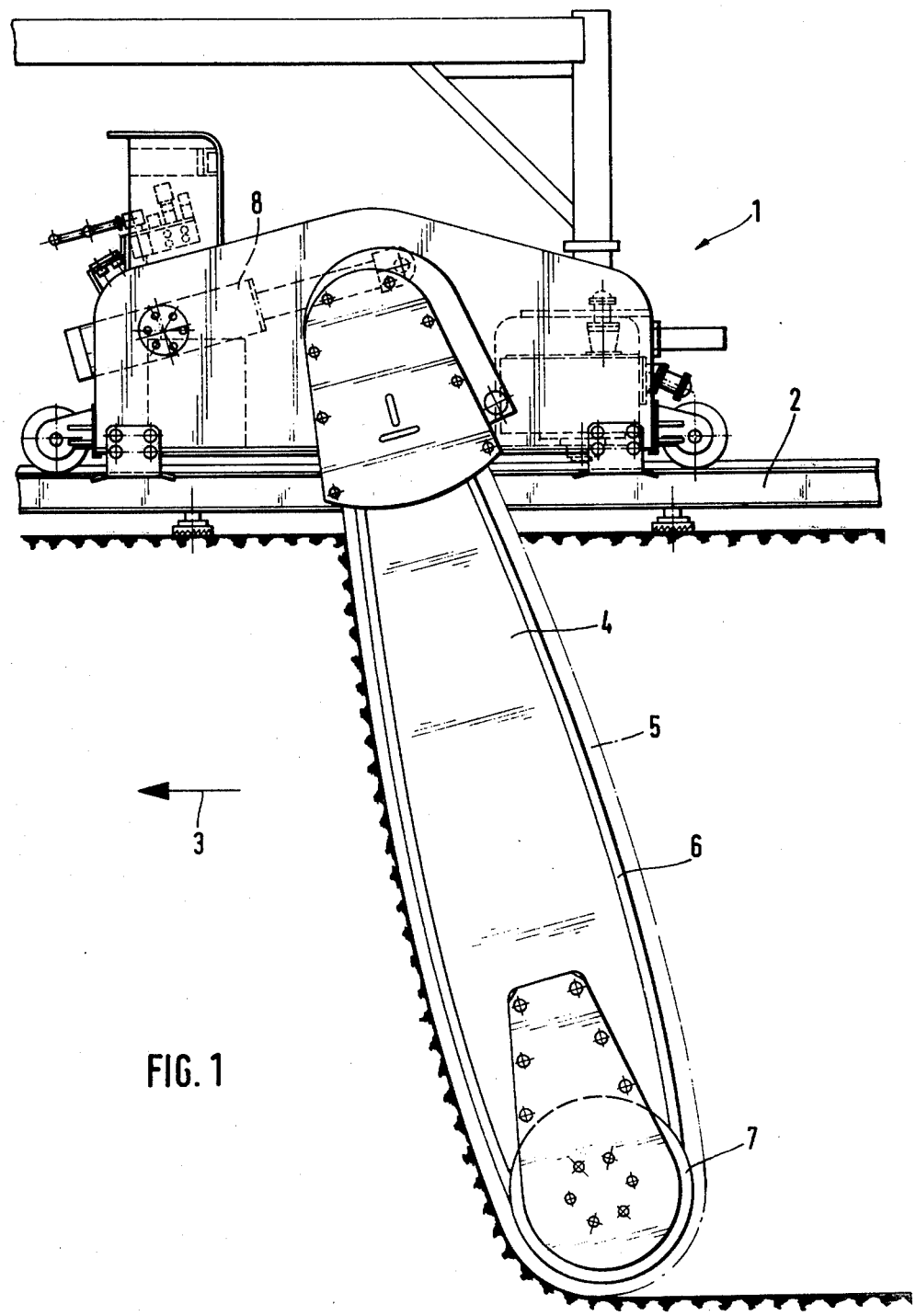
FIG. 1 is a general view of the stone cutting machine with the cutting arm pivoted into the work position; the outer contour of the rotating cutting chain is indicated.
Figure 2:
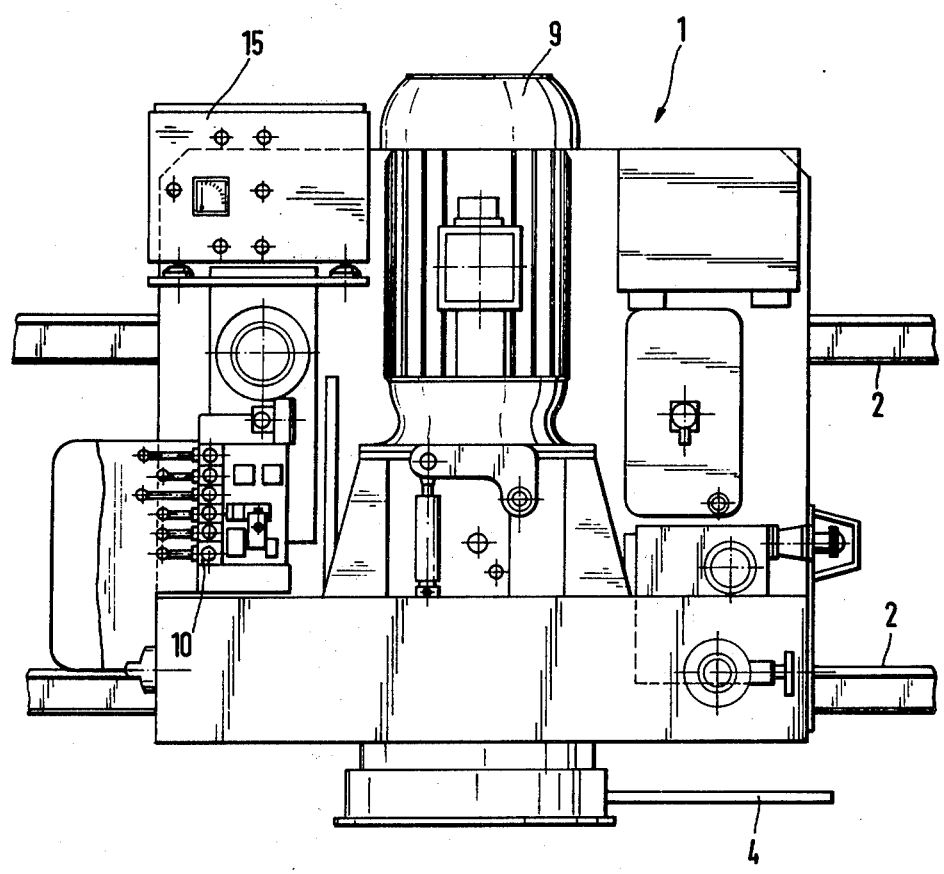
FIG. 2 is a plan view of the stone cutting machine showing the electromotor driving the stone cutting chain guided on a cutting arm and the rail-like guide frame on which the stone cutting machine is forwardly displaced.

FIG. 2 shows a plan view of the stone cutting machine 1, which is displaceable on the rail-like guide frame 2 in the direction 3. It also shows the electromotor 9 for driving the chain drive of the cutting arm 4. The hydraulic system 10 controls the hydraulic feed motor 11. The output shaft 12 of the feed motor 11 carries a drive pinion 13 engaging a rack 14 attached to the guide frame 2 (see FIG. 3) for feeding the machine in the direction 3.

To the left of FIG. 2, adjacent to the electromotor 9, is a device 15, shown in FIG. 3B in more detail, containing the circuit according to the invention for controlling the cutting power, i.e., the power consumption of the electromotor for the stone cutting chain.

In the upper part of the vertical section of FIG. 3A that is taken at right angles to the direction of travel and cutting direction of the cutting machine 1, is the device 15 containing the electrical control unit for the feed rate and cutting power. The guide system for the machine frame 16 on the guide frame 2 is also shown.

As the control system according to the invention results in the power consumption of the electromotor 9 being varied when disturbances arise, thereby increasing the strength and stability as well as the actual cutting accuracy of the machine, in contrast to similar arrangements without a control system for the cutting power, the guide roller 17 is attached to an axis 18 which is neither rotatable nor displaceable relative to the main frame 16. Neither are any special provisions required which would prevent the stone cutting machine 1 from being removed directly from the cutting channel.

FIG. 3A shows the control unit 15 containing the ammeter 19 with the threshold value contacts 22 set at 130 A and 360 A. The normal operating current of the electromotor for the chain drive system is approximately 200 A. The switch 20 provides selective automatic or manual control of the control unit and the clock 21 of the pulse interval relay 23 (see FIG. 4).

The cube-like element 24 shown in FIG. 3C contains individual basic units such as the adjusting motor 25 of the actual valve indicator, potentiometer 26 and the hydraulic feed motor control valve 27 driven by the shaft of the adjusting motor 25, and comprising the inflow and outflows P, R for the pressure medium of the hydraulic feed motor 11.

Figure 4:
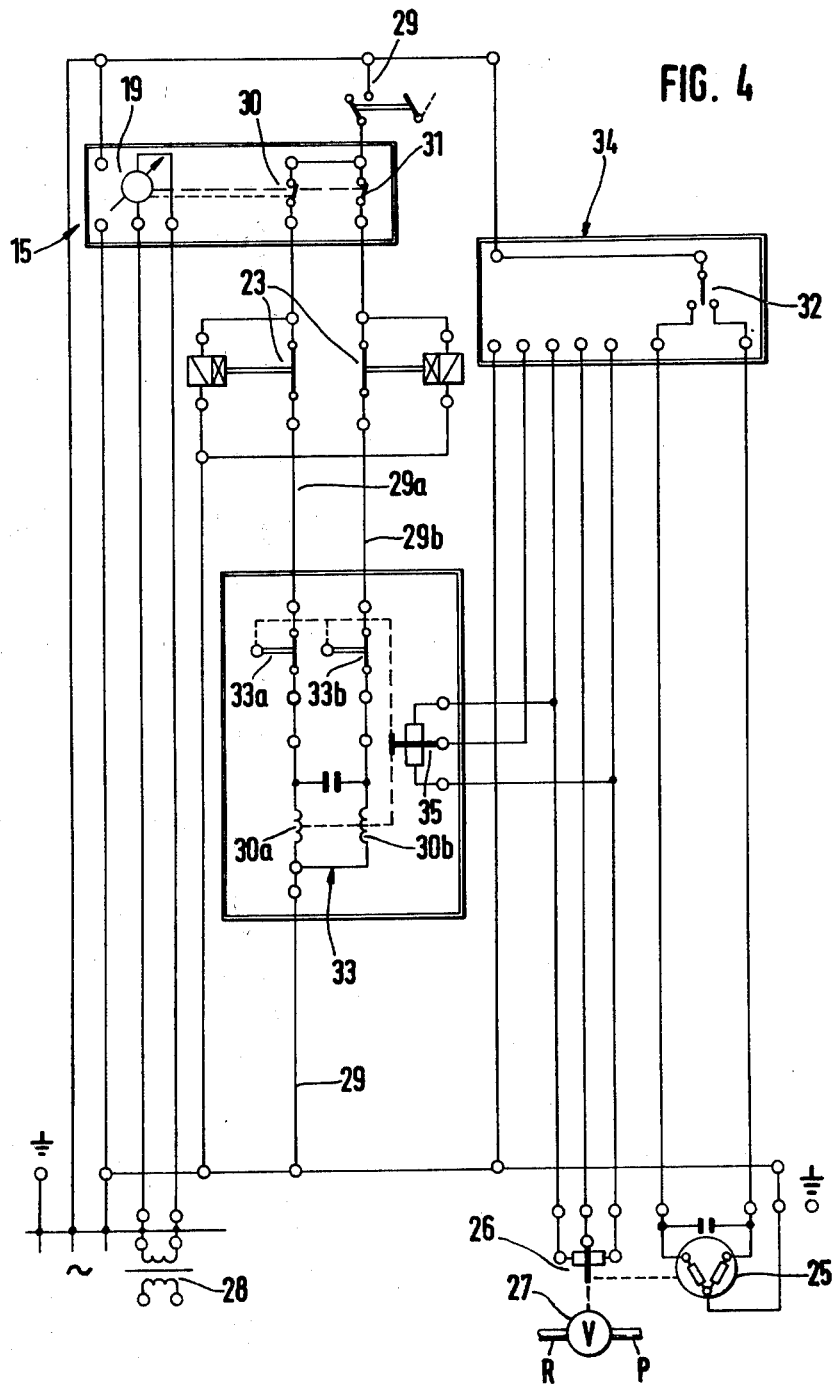
FIG. 4 is an embodiment of the circuit for controlling the feed of the machine and the power consumption of the electromotor of the stone cutting chain; the circuit of the converter receiving the power consumption of the electromotor, of the threshold value sensor with ammeter and minimum and maximum contacts, of the pulse interval relay and the bridge circuit of the actual and nominal value indicator with adjusting motor for the feed rate is represented diagrammatically.

FIG. 4 shows a control circuit by means of which the power fluctuations of the electromotor 9 measured in the converter 28 during scanning periods T, are converted into voltage values X appearing in a separate circuit 29; the values X determine nominal feed values and from these nominal feed values and the actual feed values, the feed rate adjustment signals Y are obtained in the follow-up controller 34 for adjusting the feed rate.

Figure 3:
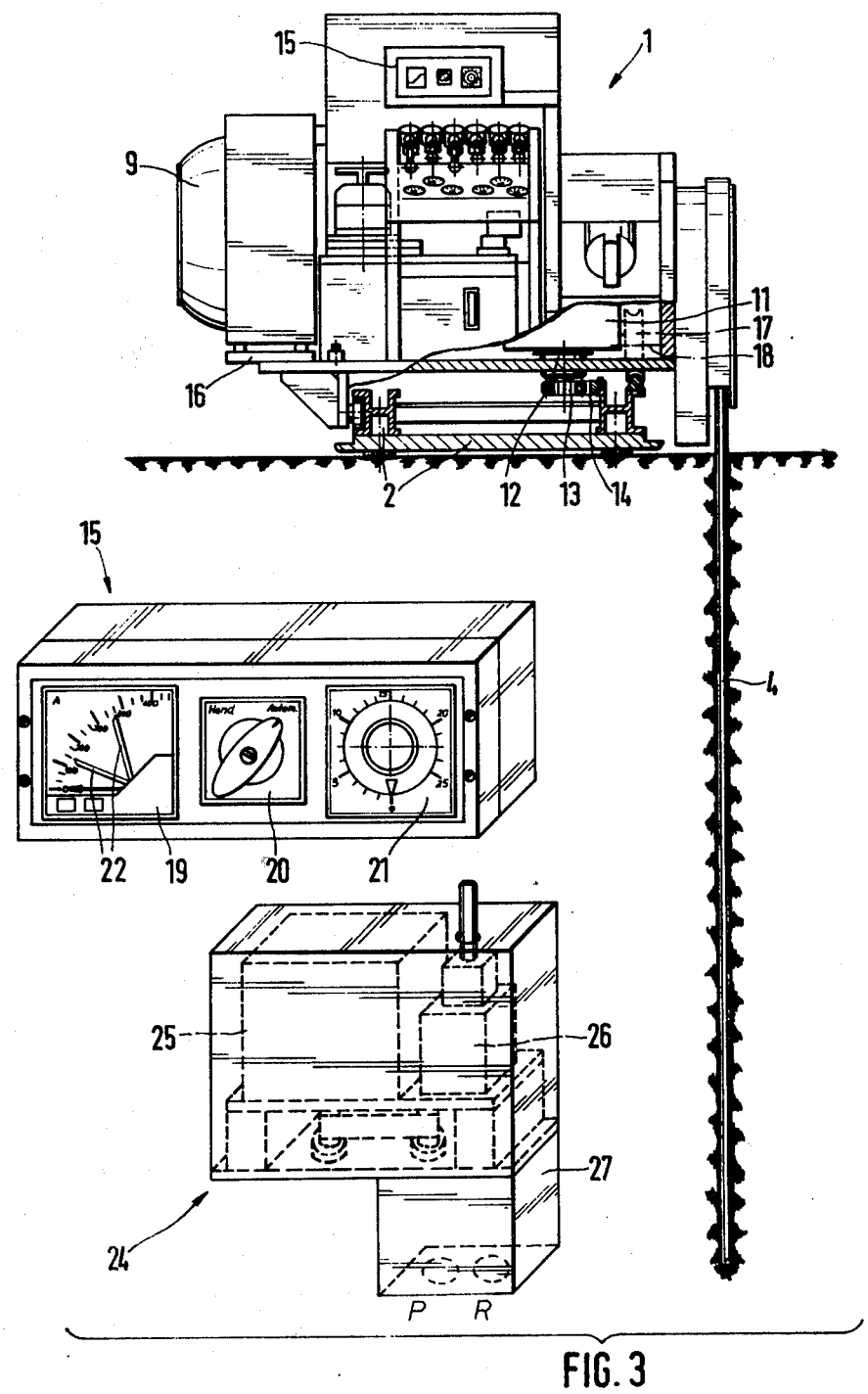
FIG. 3A is a vertical section at right angles to the direction of travel and cutting direction of the stone cutting machine.
FIG. 3B shows the housing containing the ammeter measuring the power fluctuation of the electromotor, a clock for the pulse interval relay, and a switch for switching from manual to automatic control.
FIG. 3C shows the associated actual and nominal value indicators with connection for the hydraulic feed motor.

The power fluctuations of the electromotor 9 are sensed as induced operating currents in the converter 28 and are measured in the control unit 15 by an ammeter 19. On this ammeter are threshold value contacts 22 which represent respectively the fixed maximum power consumption and the fixed minimum power consumption for driving the stone cutting chains. As shown in FIG. 3, the operating currents fluctuate between a maximum value of 360 A and a minimum value of 130 A. In the case of an average load the electromotor has a power consumption of approximately 160 KW.

The control unit 15 in addition to the ammeter 19 with its threshold contacts 22, contains a minimum switch 30 and a maximum switch 31, which switches are respectively arranged in two current paths 29a and 29b in the circuit 29 so as to open or close these paths according their position. These switches 31, 30 are connected with the threshold value contacts 22 of the ammeter 19, and are respectively closed during the periods when the power consumption is greater than the fixed maximum value amd smaller than the fixed minimum value.

A pulse interval relay 23 is connected in each of the current paths 29a, 29b. These pulse interval relays operate in such a way that the current paths 29a, 29b are only closed during the scanning periods T. In the case of the current path of the maximum switch 31, for example, the period is 30 seconds, while in the case of the current path of the minimum switch 30, for example, the period is 60 seconds. These periods may be adjusted at 21. The two current paths 29a, 29b also form two of the three power lines of the electrical adjusting motor for the nominal value indicator 35 and respectively contain the electromotor induction coils 30a, 30b. Accordingly, the motor runs forwards or backwards in the scanning periods T depending on which of the switches 30, 31 is closed. The potentiometer 35 has limit switches 33a, 33b.

The nominal value indicator 35 is a potentiometer driven by the electromotor having coils 30a, 30b, which potentiometer is connected in a bridge circuit with the potentiometer 26 of the actual value indicator of the feed rate. The differential voltage which prevails between the tapping points of the two potentiometers 35, 26 is amplified in the follow-up controller 34, and, according to polarity, serves to control the regulator 32 by means of which the forward or return movement of the adjusting motor 25 is determined.

The adjusting motor 25 now balances the two potentiometers 35 and 26 in the individual scanning periods T and thereby adjusts accordingly the hydraulic flow regulating valve 27 of the hydraulic feed motor 11.

Through suitable selection by control 21 of the duration of the scanning periods and the intervals between the individual scanning periods, the feed rate can be regulated with the desired accuracy as a function of the power fluctuations of the electromotor. The lag of the control system is determined mainly by the potentiometers 35 and 26 and their adjusting motors 25, 33.

OPERATION

During cutting, the motor 9 will be drawing power in accordance with the various conditions mentioned above, and with the inductive converter 28, a current will be produced in the circuit containing ammeter 19, so that ammeter 19 will provide an indication of the power being drawn by the motor 9. For automatic operation, the switch 20 is closed, and the adjustment 21 is operated to obtain the desired pulse interval or scanning period T.

If the current as measured by the ammeter 19 drops below 130 A, indicating an abnormal decrease in motor power, the minimum threshold contacts will be engaged to close switch 30 and operate the pulse interval relay 23. When the switch of the pulse interval relay 23 is closed, a power line will be completed through switch 20, switch 30, switch 23, limit switch 33a, and induction coil 30a to operate the nominal value motor in one direction to correspondingly adjust the nominal value indicator potentiometer 35; if such adjustment is made to one limit of the potentiometer, the limit switch 33a will open to prevent further adjustment of the potentiometer 35. At the end of the interval T, as determined by the pulse interval relay 23, the relay switch 23 will open and discontinue further adjustment of the potentiometer 35. The cutting machine is already moving in the forward direction at a feed rate as determined by its hydraulic motor 11 under the control of the hydraulic supply and exhaust valve 27. The valve 27 is interconnected with the potentiometer 26, so that the potentiometer 26 supplies an indication of the valve position and thus an indication of the actual value of feed rate. The potentiometers 26 and 35, being in a bridge circuit, will produce a differential signal Y in the followup controller, which is amplified and according to its polarity will operate relay switch 32 to drive the adjusting motor 25 in the direction to increase the feed rate, that is in the direction to operate valve 27 so as to supply more fluid to the hydraulic motor 11, which operation of valve 27 will be fed back through potentiometer 26 to balance the circuit.

On the other hand, if the current flowing through ammeter 19 exceeds the maximum power value, the threshold maximum switch 22 will cause the closing of switch 31 and complete a circuit to operate the other pulse interval relay 23 and thereby, during the scanning period T, complete a circuit through switch 20, switch 31, switch 23, limit switch 33b, and induction coil 30b to operate the motor adjusting potentiometer 35 in the direction opposite to that mentioned for the minimum value; if the other limit of the potentiometer 35 is reached, the limit switch 33b will be opened to prevent further adjustment of the potentiometer 35. The differential signal now produced in the following controller 34 will be of opposite polarity to that produced when the minimum power value is not obtained, to thereby operate relay switch 32 in the opposite direction and correspondly operate motor 25 in the opposite direction, which will move valve 27 to a position to reduce the fluid supply to the hydraulic motor 11 and thereby reduce the feed rate, which reduction in feed rate is sensed by potentiometer 26 to balance the potentiometer bridge circuit.

While a preferred embodiment of the invention has been illustrated in detail, with specific values as examples, further embodiments, variations and modifications are all contemplated according to the spirit and scope of the following claims.

I claim:

1. A process for cutting stone, comprising the steps of: feeding a cutting machine forwardly on a guide frame at a feed rate;
   cutting the stone by means of a rotating stone cutting chain guided on a cutting arm and driven by an electromotor;
   producing an electrical control value X correlated to the power fluctuation of the electromotor within a limited scanning period T;
   producing an actual elongation signal correlated to the feed rate;
   comparing the actual electrical signal with the electrical value X and producing a feed rate adjustment signal Y correlated to such comparison;
   adjusting the feed rate according to the feed rate adjustment signal Y; and
   conducting the above-mentioned steps so that the scanning period T in the case of a power fluctuation below the fixed minimum value is approximately twice as long as the scanning period T in the case of a power fluctuation exceeding the fixed maximum value for the power consumption of the electro-motor.

2. A process for controlling the cutting power as claimed in claim 1, wherein the electrical control value X is only produced when the power fluctuation of the electromotor is below a fixed minimum value and above a fixed maximum value for the power consumption of the electromotor.

3. A process for controlling the cutting power as claimed in claim 1, wherein the electrical control value X is only produced when the power fluctuation of the electromotor is below a fixed minimum value for the power consumption of the electric motor.

4. A process for controlling the cutting power as claimed in claim 1, wherein the electrical control value X is only produced when the power fluctuation of the electromotor is above a fixed minimum value for the power consumption of the electric motor.

* * * * *